United States Patent [19]

Sanders et al.

[11] Patent Number: 4,816,637

[45] Date of Patent: Mar. 28, 1989

[54] UNDERWATER AND ABOVE-WATER PLASMA ARC CUTTING TORCH AND METHOD

[75] Inventors: Nicholas A. Sanders, Norwich, Vt.; Richard W. Couch, Jr., Hanover, N.H.

[73] Assignee: Hypertherm, Inc., Hanover, N.H.

[21] Appl. No.: 57,729

[22] Filed: Jun. 2, 1987

Related U.S. Application Data

[63] Continuation of Ser. No. 801,488, Nov. 25, 1985, abandoned.

[51] Int. Cl.⁴ ............................................. B23K 9/00
[52] U.S. Cl. ......................... 219/121.59; 219/121.51; 219/121.48; 219/75; 219/121.39
[58] Field of Search ...... 219/121 PY, 121 P, 121 PM, 219/121 PQ, 121 PP, 121 PR, 121 PC, 121 PH, 74, 75, 76.16; 313/231.31, 231.41, 231.51

[56] References Cited

U.S. PATENT DOCUMENTS

| | | | |
|---|---|---|---|
| 2,906,858 | 9/1959 | Morton, Jr. | 219/121 PP |
| 3,082,314 | 3/1963 | Arata et al. | 219/75 |
| 3,131,288 | 4/1964 | Browning | 219/121 |
| 3,534,388 | 10/1970 | Ito et al. | 219/121 |
| 3,619,549 | 11/1971 | Hogan et al. | 219/121 |
| 3,641,308 | 2/1972 | Couch, Jr. et al. | 219/121 |
| 3,787,247 | 1/1974 | Couch, Jr. | 148/9 |
| 3,833,787 | 9/1974 | Couch, Jr. | 219/121 |
| 4,029,930 | 6/1977 | Sagara et al. | 219/75 |
| 4,203,022 | 5/1980 | Couch, Jr. et al. | 219/121 |

FOREIGN PATENT DOCUMENTS

| | | |
|---|---|---|
| 1227179 | 4/1971 | United Kingdom . |
| 1326128 | 8/1973 | United Kingdom ......... 219/121 PY |
| 1326624 | 8/1973 | United Kingdom . |
| 2057951 | 4/1981 | United Kingdom . |

*Primary Examiner*—M. H. Paschall
*Attorney, Agent, or Firm*—Wolf, Greenfield & Sacks

[57] ABSTRACT

A plasma arc cutting torch and method for obtaining more efficient cuts underwater, and for muffling the noise and radiation of a plasma cutting torch when used above water, surrounds the plasma arc with high-pressure, high-velocity annular flows of air and water. In one embodiment, a radially inward air flow creates a high-pressure, water-free cutting zone around the plasma while a surrounding radially outward water flow cooperates with and stabilizes the air flow. The water-free cutting zone created during underwater cutting, or above-water cutting on a water-table, includes the cut itself and the underside of the workpiece in the vicinity of the plasma. The air flow prevents water from interfering with the progress of the cut and hydrogen gas from accumulating under the workpiece.

18 Claims, 2 Drawing Sheets

[4,816,637]

UNDERWATER AND ABOVE-WATER PLASMA ARC CUTTING TORCH AND METHOD

BACKGROUND OF THE INVENTION

The present invention relates to plasma arc cutting torches, and more particularly to a plasma arc cutting torch that can operate above or below water to provide high quality cuts in metal, with reduced noise, airborne particulate pollution, ultra-violet (UV) radiation, and glare.

Without muffling, typical noise levels produced in cutting ½ inch mild steel with a 400 Amp nitrogen plasma arc torch are on the order of 110 dbA. This is clearly a high noise level which needs to be controlled. In this country, certain OSHA regulations require that noise levels be kept below 95 dbA with a 50% duty cycle, and many European countries require noise levels below 85 dbA. Plasma arc cutting also produces airborne pollutants, UV radiation, and glare at levels that can be bothersome at best, and health hazards at worst.

The methods of muffling plasma arc cutting torches that are currently known include a water-table, a low-velocity thick-walled water sheath, and submerging the workpiece in water.

Underwater plasma arc cutting has become a popular method for reducing noise, airborne particulate pollution, and UV radiation and glare. While environmental advantages of underwater cutting are clear, there are numerous drawbacks. Underwater cutting typically requires a 10 to 20% increase in power level with a 10 to 20% decrease in cutting speed. Cut quality is also reduced with an increase in adhering dross. In addition, the presence of water makes the sensing of obstructions and initial height much more difficult when using a positioning system based upon plasma vortex pressure such as described in U.S. Pat. No. 4,203,022 to Couch, Jr., et al.

To date, only non-reactive plasma-forming gases such as nitrogen have been used in underwater plasma arc cutting. This has been due, in part, to the lower currents associated with the plasma arc columns of reactive plasma-forming gases such as oxygen and air. Reactive gases are more susceptible to the effects of water near the plasma than non-reactive gases.

Other problems with current methods of underwater plasma arc cutting are that water continuously flows into the cutting zone which substantially degrades the quality of the cut, and gaseous cutting products such as hydrogen accumulate under the workpiece. The accumulation of hydrogen under the workpiece presents a dangerous situation because of its tendency to detonate in a sporadic and uncontrolled manner.

Alternatively, noise from above-water plasma arc cutting torches can be muffled by placing the workpiece on a water-table such as disclosed in U.S. Pat. No. 3,787,247 to Couch, Jr. However, the water on the underside of the plate and in the cut itself generally reduces the quality of the cut, and the hydrogen which accumulates under the workpiece creates a dangerous situation.

Noise can also be reduced through use of a muffling device as described in U.S. Pat. No. 3,833,787 to Couch, Jr. That device operates by providing a low velocity, thick-walled, cylindrical water sheath around the plasma arc column. However, problems similar to those observed in underwater cutting are exhibited; namely, the water flow interferes with the plasma, adversely affecting the cut. This problem is particularly acute when utilizing a reactive plasma-forming gas such as oxygen or air. Even the combination of the water-table and the low velocity water sheath is not sufficient to reduce noise to less than 90 dbA.

It is therefore a principal object of this invention to provide high speed plasma arc cutting underwater with low power consumption.

Another principal object of this invention is to reduce the noise, airborne pollutants, UV radiation, and glare of plasma arc cutting above water.

It is still another object to improve the sensing of obstructions and initial height when performing plasma arc cutting underwater.

A further object is to improve the quality of cuts made by a plasma arc torch underwater by allowing use of reactive plasma-forming gases.

It is still a further object to improve the quality of plasma arc cutting underwater or on a water-table.

Yet a further object is to prevent water from interfering with the plasma arc column while cutting.

A further object is to prevent hydrogen from accumulating on the underside of the workpiece.

A still further object is to provide a device which can be constructed relatively simply and economically, and can be easily adapted to or attached upon existing plasma arc torches.

Other objects will in part be apparent and in part pointed out hereinafter.

SUMMARY OF THE INVENTION

The present invention relates to a plasma arc cutting torch and method useful either below or above water, which reduces noise and other environmental disturbances by surrounding the plasma with two fluids, yet does not interfere with or degrade the cut. The invention includes surrounding the plasma arc column with a high-pressure annular jet of a gaseous fluid such as air, and surrounding the gas flow with a high-velocity annular jet of a liquid fluid such as water. Both fluids flow from nozzles which are annularly spaced from the plasma arc. Either of these annular fluid jets may take a conical shape, and in a preferred embodiment both fluid jets take a conical shape. The gas surrounds and stabilizes the plasma with a radially inward annular conical flow, and the liquid surrounds and stabilizes the gas flow with a radially outward annular conical flow that is spaced away from the plasma arc column.

In underwater cutting, the gas creates a high-pressure water-free space in the cutting zone, which includes the space between the workpiece and the plasma torch, the space within the cut, and the underside of the workpiece below the plasma torch. Water is thus kept out of the cut and away from the plasma arc.

In above-water cutting, the high-pressure gas flow along with the outward radial direction of the high-velocity liquid flow, combine to insure that the plasma arc is not interfered with during cutting, while effectively muffling the plasma jet noise. For such above-water cutting, the invention can be used in conjunction with a water-table. The gas flow functions as it does in underwater cutting, keeping the cut and the area below the plate free of water, and keeping water away from the plasma.

In both above and below water cutting, the underside of the workpiece is continuously being flushed with the injected air, preventing hydrogen gas from accumulating.

The present invention may be embodied as an attachment to known plasma arc cutting torches, such as, for example, the torch disclosed in U.S. Pat. No. 3,641,308 to Couch, Jr., et al. That torch utilizes a liquid laminar flow within the torch nozzle to constrict the plasma arc. It is important to note that the present invention employs a separate and distinct high-velocity liquid flow to form a sound barrier and pressure boundary about a water-free cutting zone. The high-velocity liquid flow is separated from the plasma arc column by the high-pressure gas flow. As this liquid flow does not interact with or constrict the plasma, it is distinguished from the liquid laminar flow of the aforesaid patent. The high-pressure gas flow employed in this invention to provide a water-free cutting zone, is similarly distinct and distinguished from the plasma-forming ionizable gas flow around and adjacent to the electrode.

DETAILED DESCRIPTION OF THE PREFERRED EMBODIMENT

Figure 1:
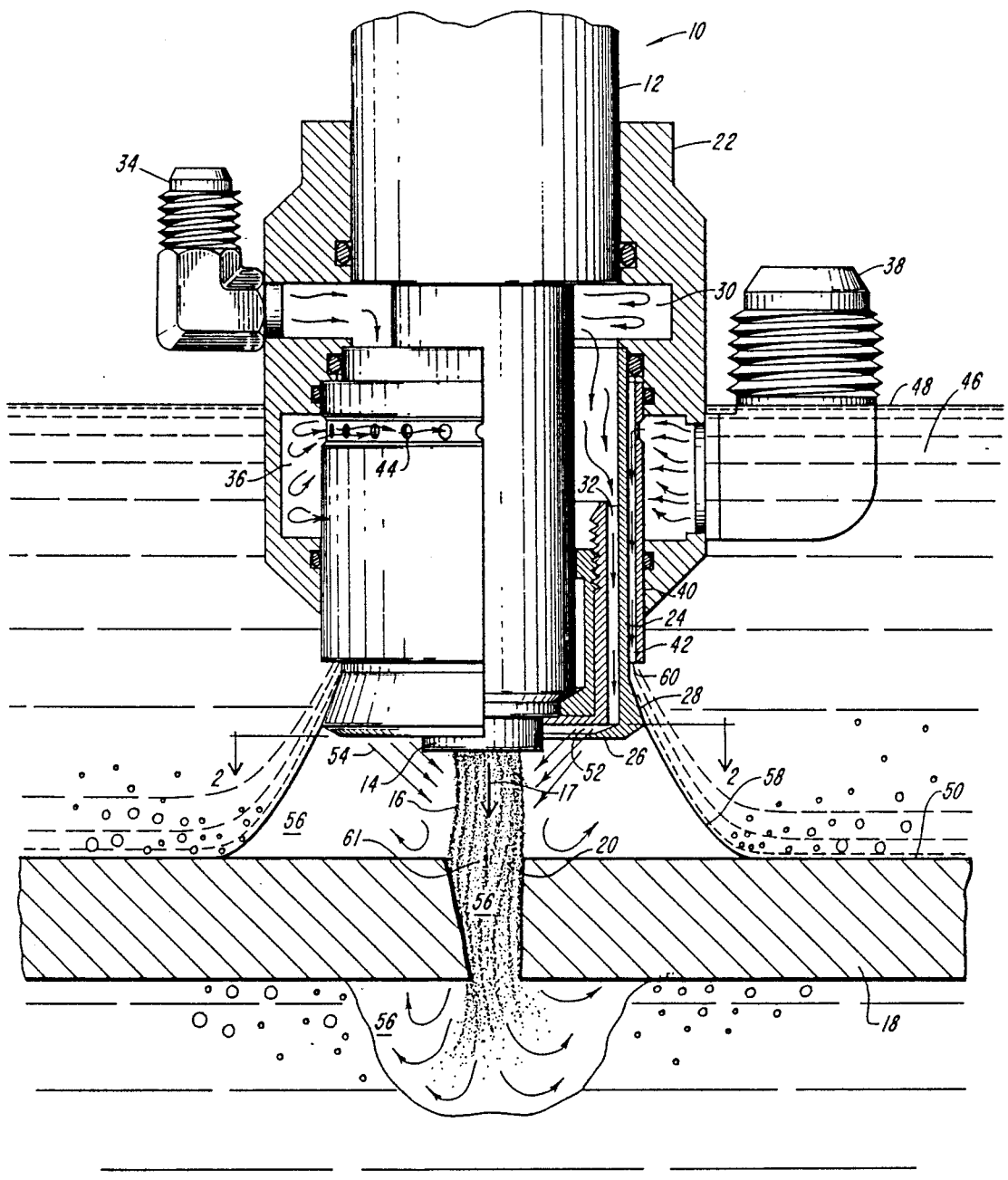
FIG. 1 is a view in partial vertical section of a preferred embodiment of an attachment to a plasma torch cutting system constructed in accordance with the present invention, shown performing underwater cutting.
Figure 2:
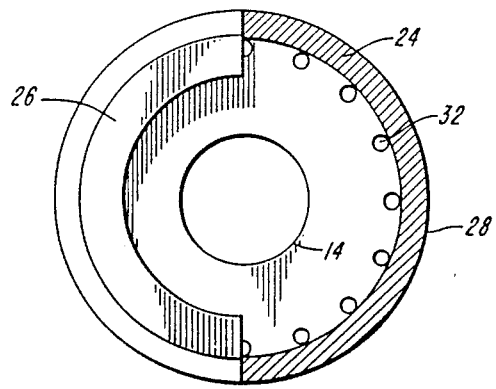
FIG. 2 is a cross-sectional view of the apparatus taken substantially on the line 2—2 in FIG. 1.
Figure 3:
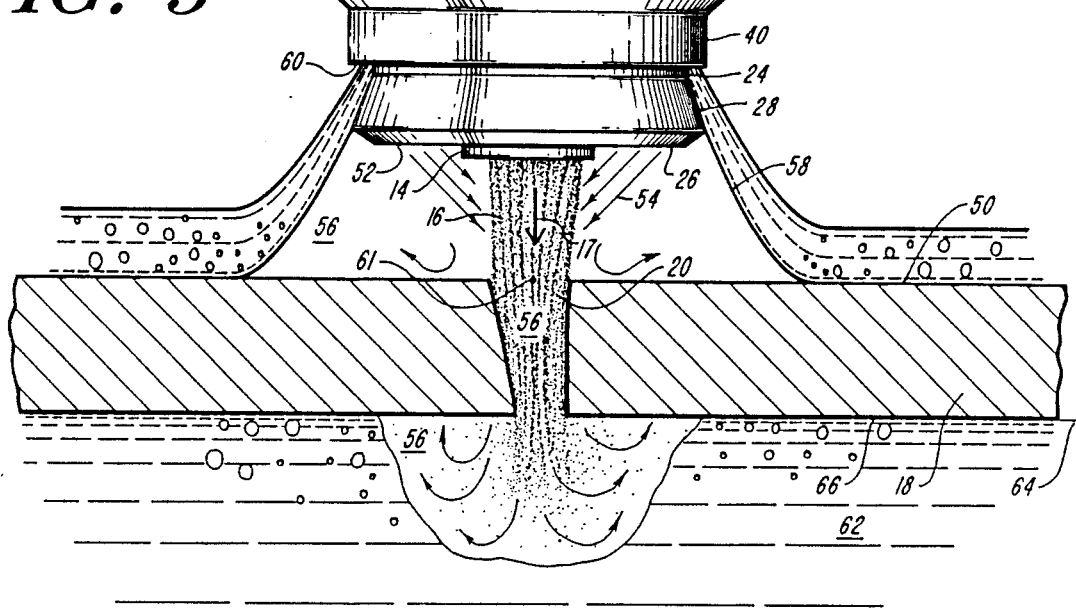
FIG. 3 is a side elevation corresponding to FIG. 1, showing the same apparatus used for above-water cutting on a water-table.

Referring to FIGS. 1, 2 and 3, there is a plasma arc cutting torch 10 having a generally cylindrical body 12 and a torch nozzle 14 producing a high velocity plasma arc column 16. The plasma arc 16 is projected in a direction indicated by arrow 17, and cuts through a workpiece 18, producing a high quality cut 20. As shown, the plasma torch 10 is generally of the type disclosed in U.S. Pat. No. 3,641,308. As is typical of plasma arc cutting torches, it encloses an electrode which is connected to an external electric power source which generates an arc between the torch electrode and a workpiece. A flow of an ionizable gas is directed around and adjacent to the electrode, so that a plasma arc column is formed, which cuts the workpiece.

In accordance with the present invention, an attachment body 22 having a retaining cap 24 is placed around the torch body 12. The lower end of the retaining cap 24 has both an inwardly projecting circumferential edge 26 and an outwardly projecting circumferential edge 28. A gap between the upper part of the attachment body 22 and the torch body 12 forms an annular gas plenum 30. Below the gas plenum 30, a series of axial holes 32 leading toward the inward circumferential edge 26 are drilled into the retaining cap 24. These axial holes 32 extend around the retaining cap 24. The placement of the axial holes 32 can best be seen from FIG. 2. A gas inlet 34 connects the gas plenum 30 with a pressurized external supply of a gas, preferably air (not shown).

The lower end of the attachment body 22 has an annular liquid plenum 36 connected by a liquid inlet 38 to a pressurized external supply of a liquid, preferably water (not shown). Defining the inside circumferential wall of the liquid plenum 36 is a liquid flow sleeve 40. Inside of the liquid flow sleeve 40 is an annular liquid space 42 which is open at the bottom. A series of radial holes 44 extending around the torch allows water to flow from the liquid plenum 36 into the space 42.

For underwater cutting, as shown in FIG. 1, most of the apparatus is submerged in water 46 having a surface 48 which is typically about 3 inches above an upper surface 50 of the workpiece 18. A gas, preferably air, under pressure with a flow rate between 2 and 20 scfm, flows into the gas inlet 34. It then fills the gas plenum 30 and flows downward through the axial holes 32. The air exits the retaining cap 24 near the inward circumferential edge 26 through an annular gas nozzle 52. The air is thus directed toward the plasma 16 as an inward annular conical air flow 54, having a radial flow vector component transverse to the direction 17 of the plasma 16. The air flow 54 stabilizes the plasma arc column 16 and creates a high-pressure water-free space in a cutting zone 56. Note that the cutting zone 56 not only includes the space between the workpiece 18 and the plasma torch 10 but also and more importantly, the area of the cut 20 itself, and the underside of the workpiece 18 immediately below the plasma torch 10. In this way, the pressurized air acts as a dam in the cut 20, stopping water from coming into the cutting zone 56. In addition, the air flow through the cut 20 helps keep the underside of the cutting zone 56, including the area under the portion of the workpiece 18 about to be cut, free of water. Gaseous cutting products, such as hydrogen, which otherwise tend to accumulate on the underside of the workpiece 18, are also driven out by the pressurized air. As used in this specification, the term high-pressure is defined as being a sufficient pressure to create the water-free cutting zone 56. As will be readily understood by those skilled in the art, this figure will depend upon conditions such as the size of the gas nozzle 52 and distance from the torch nozzle 14 to the workpiece 18.

In addition to the gas flow 54, and operating in cooperation with it, another principal feature of the present invention is a high velocity conical liquid flow 58. A liquid, preferably water, under pressure and at a flow rate of approximately 20 gpm, enters the liquid plenum 36 from the liquid inlet 38. It flows through the radial holes 44, then downward within the annular liquid space 42 toward the outward circumferential edge 28. The water exits the retaining cap 24 at an annular liquid nozzle 60. Thus, water flows around the upper part of the cutting zone 56 as the outward annular conical water flow 58, having a radial flow vector component transverse to the direction 17 of the plasma 16. The water flow 58 creates a high speed air-water interface that resists the incursions of water into the cutting zone 56 and helps to eject bubbles of air that accumulate at the upper surface 50 of the workpiece 18.

The water flow 58, which flows from the liquid nozzle 60 and radially outward thereafter, is annularly spaced from the plasma arc 16 at all points along its flow path. (This is in sharp contrast to arc-constricting water flows of the prior art, such as is disclosed in U.S. Pat. No. 3,641,308 to Couch and Dea.)

By keeping water out of the cutting zone 56, the quality of the cut 20 is greatly improved, and it becomes practical to use reactive plasma-forming gases such as oxygen and air for the plasma arc column 16. Smooth, dross free, square cuts have been consistently made with oxygen-plasma under 3 inches of water on ½ inch and 1 inch mild steel. For ½ inch mild steel, the current, voltage, and cutting speed settings are the same as above water. For 1 inch mild steel, the current and voltage settings are the same as above water and the cut speed alone is reduced by 10 to 20%. The noise levels produced when cutting underwater have been measured and were less than 85 dbA for both oxygen and nitrogen plasmas with maximum currents of 260 and 400A respectively. Cutting was done under 3 inches of water. Noise measurements were made 6 feet from the torch.

For above-water muffling of a plasma torch as shown in FIG. 3, the operation of the invention is similar to that described in conjunction with the underwater mode. The primary difference, of course, is that the apparatus is not submerged in water. In this mode, the surrounding flow of water creates a noise pollution, and UV barrier, and helps to pressurize the cutting zone.

In typical above-water operation, water, under pressure and at a flow rate of approximately 20 gpm, enters the attachment body 22 via the liquid inlet 38. It flows, as it did in the underwater mode, through the attachment body 22 and out the annular liquid nozzle 60 where it is deflected by the outward circumferential edge 28 on the retaining cap 24, thus creating the high velocity, radially outward conical water flow 58. This high-velocity water flow 58 creates a complete enclosure around the arc, extending from the lower end of the plasma torch 10 to the upper surface 50 of the workpiece 18, becoming an effective muffling device by trapping sound waves created during cutting within the enclosure. Light, radiation, and particulate pollution are also trapped in the cutting zone 56 by the water flow 58. By deflecting the annular water jet 58 out radially in a bell shape, water is directed away from the cutting zone 56 reducing the possibility of it interfering with the plasma cutting process. This is especially important when cutting with reactive plasma-forming gases such as oxygen and air.

As in the underwater mode, the quality of the cut 20 can be improved by a high-pressure gas flow in the above-water mode. Again, air, under pressure with a flow rate of between 1 and 10 scfm, enters the attachment body 22 via the gas inlet 34. Experiments on the prototype system indicate that an air flow above approximately 10 scfm disturbs the water jet and reduces the muffling effect. The air flows through the attachment body 22 to the annular gas nozzle 52. It is then directed as the radially inward annular conical air flow 54 toward a point 61 below the torch nozzle 14. Optimally, the angle of the inward circumferential edge 26 should be selected to direct the air flow 54 toward the point 61 where the cut 20 begins at the upper surface 50 of the workpiece 18. In this manner, the air flow 54 serves to further reduce the possibility that the water flow 58 will interfere with the plasma arc column 16, increasing the quality of the cut 20, particularly when using a reactive plasma-forming gas.

By operating the invention in this above-water muffling mode, reduction in noise levels are greatly improved over the muffling device described in U.S. Pat. No. 3,833,787. That device utilizes a thick-walled, slow moving, almost stagnant, falling sheath of water around the plasma, in contrast to the high-pressure, high-velocity conical jet of the present invention. The velocity of the radially outward annular conical water flow 58 is typically about 21.8 feet per second with a typical thickness of about 0.042 inch, whereas the water sheath of the aforementioned patent had a velocity of about 8.7 feet per second and a thickness of about 0.125 inch. As used in this specification, the term high-velocity is defined as being an increase of at least about 50% over this prior art flow rate, or stated in other terms, at least about (12 feet per second,) whether operating in the above-water or underwater modes. The wall thickness is not critical, although a thicker wall yields better sound insulating characteristics. A typical water flow wall thickness when operating according to this invention is about 0.04 to 0.08 inch. At greater thicknesses, to maintain a high flow velocity, pumping requirements become prohibitive. The noise levels produced when cutting have been measured and were, in all cases, less than 90 dbA when cutting with nitrogen-plasma to a maximum current of 400A and were less than 86 dbA when cutting with oxygen-plasma to a maximum current of 260A. All measurements having been taken 6 feet from the torch while cutting ½ inch mild steel.

Above-water muffling and pollution control can be further improved through use of a water-table as disclosed in U.S. Pat. No. 3,787,247. In such operation, a quantity of water 62 is added to a cutting table (not shown) so that a top surface 64 of the water 62 is in contact with or in close proximity to, a bottom surface 66 of the workpiece 18. In this mode, the inward annular conical air flow 54 creates the water-free cutting zone 56 which includes the cut 20 and underside of the workpiece 18 below the plasma torch 10. As with the underwater mode, the air flow 54 stabilizes the plasma arc 16, and the water-free cutting zone 56 acts as a dam keeping water from flowing into the cut 20, and driving gaseous cutting products such as hydrogen out from the underside of the workpiece 18. By keeping water away from the cut 20, the quality of the cut is increased. When the present invention is used in the preferred above-water mode, with conical jets of both air and water, and with the workpiece placed on a water-table, noise levels are reduced to below 90 dbA when cutting ½ inch mild steel with nitrogen-plasma to a maximum current of 400A and to below 86 dbA when cutting with oxygen-plasma to a maximum current of 260A. Noise measurements were made 6 feet from the torch.

It is thus seen that the objects of this invention have been achieved and other advantageous results attained in that there has been disclosed a method and apparatus which permits decreases in power level and increases in cutting speed for underwater cutting, which effectively muffles noise, particulate pollution, light, and radiation from above-water cutting, which improves sensing of obstructions and initial height, which permits underwater use of reactive plasma-forming gases, which improves the quality of plasma arc cutting underwater or on a water-table, which prevents interference with the plasma arc column, which expels hydrogen gas from the underside of the workpiece, which is simple and economical to construct, and can be easily adapted to existing plasma arc torches.

While FIGS. 1, 2 and 3 show attachments to a plasma torch, it is to be understood that such structure is not intended as any limitation, as the present invention might be incorporated within a torch body, rather than as an attachment thereto.

Various modifications of the present invention will become apparent to those skilled in the art from the foregoing description and accompanying drawings. For example, while the operation of the invention has been described in conjunction with cutting a workpiece, it would also be useful when performing underwater welding of one or more workpieces. Such modifications are intended to fall within the scope of the appended claims .

What is claimed is:

1. In a method of operating a plasma arc torch in conjunction with at least one metal workpiece, the plasma arc torch being of the type wherein a flow of an ionizable gas is produced around and adjacent to an electrode within a torch body to generate a plasma, and the plasma is projected as a high velocity arc column through a torch nozzle to the workpiece, the improvement comprising:
   surrounding the plasma arc column extending from the torch nozzle to the workpiece with a relatively high pressure annular flow of a gas;
   surrounding said high pressure annular gas flow with a substantially continuous, relatively high velocity annular flow of a liquid having a velocity in excess of 8.7 ft. per second;
   directing said high pressure annular gas flow radially inward; and
   directing said liquid flow to be annularly spaced from the plasma arc column so that said liquid does not interfere with the plasma arc.

2. The method of claim 1 further comprising:
   providing both said flows from nozzles that are annularly spaced from the torch nozzle.

3. The method of claim 1 further comprising:
   directing at least one said flow to take a conical shape.

4. The method of claim 1 hwerein said flowing liquid has a velocity of at least about 12 feet per second.

5. The method of claim 4 wherein said flowing liquid has a wall thickness of less than 0.125 inch.

6. The method of claim 3 wherein
   said liquid flow is radially outward.

7. The method of claims 1 or 6 further comprising: submerging the workpiece underwater.

8. The method of claim 7 further comprising: the step of generating the plasma from a reactive plasma-forming gas.

9. In a plasma arc torch, of the type having a body, an electrode disposed in the body, means for producing a flow of an ionizable gas around and adjacent to the electrode to generate a plasma, and a torch nozzle to project the plasma as a high velocity arc column to a workpiece, the improvement comprising:
   means for surrounding the plasma arc column extending from the torch nozzle to the workpiece with a relatively high pressure annular flow of a gas,
   means for directing said high pressure annular gas flow radially inward, and
   means for surrounding said high pressure annular gas flow with a substantially continuous, relatively high velocity flow of a liquid having a velocity in excess of 8.7 ft. per second annularly spaced from the plasma arc column so that said liquid does not interfere with the plasma arc.

10. In a plasma arc torch, of the type having a body, an electrode disposed in the body, means for producing a flow of an ionizable gas around and adjacent to the electrode to generate a plasma, and a torch nozzle to project the plasma as a high velocity arc column to a workpiece, the improvement comprising:
    means for surrounding the plasma arc column extending from the torch nozzle to the workpiece with a relatively high pressure annular flow of a gas,
    means for directing said gas flow radially inward, and
    means for surrounding said high pressure annular gas flow with a substantially continuous, relatively high velocity flow of a liquid having a velocity in excess of 8.7 ft. per second annularly spaced from the plasma arc column so that said liquid does not interfere with the plasma arc.

11. The apparatus of claim 10 wherein said first nozzle directing means directs said conical gas flow toward the plasma arc column at the top of the workpiece.

12. The apparatus of claim 10 wherein said second nozzle means cooperates to produce said liquid flow with a velocity of at least about 12 feet per second.

13. The apparatus of claim 12 wherein said second nozzle means cooperates to produce said liquid flow with a wall thickness of less than 0.125 inch.

14. The apparatus of claim 10 wherein
    said second nozzle includes means for directing said liquid flow in a radially outward conical shape.

15. The apparatus of claim 14 wherein said first nozzle includes an inward projecting circumferential edge; and
    said second nozzle includes an outward projecting circumferential edge.

16. The apparatus of claim 9 wherein both said surrounding flow means are secured to said plasma arc torch body.

17. The apparatus of claim 16 wherein both said annular nozzles are defined by a collar secured at the lower end of said plasma arc torch body.

18. The apparatus of claim 17 wherein said collar has a circumferential gas plenum around said torch body, and a plurality of axial holes leading from said gas plenum to said first nozzle; and
    said collar has a circumferential liquid plenum around said gas plenum, an annular space around said axial holes leading to said second nozzle, and a plurality of radial holes leading from said liquid plenum to said annular space.

* * * * *